US010106160B2

(12) United States Patent
Nilsson et al.

(10) Patent No.: US 10,106,160 B2
(45) Date of Patent: Oct. 23, 2018

(54) DRIVING AID ARRANGEMENT, A VEHICLE AND A METHOD OF CONTROLLING A LONGITUDINAL VELOCITY OF A VEHICLE

(71) Applicant: VOLVO CAR CORPORATION, Gothenburg (SE)

(72) Inventors: Jonas Nilsson, Molndal (SE); Mattias Erik Brannstrom, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 44 days.

(21) Appl. No.: 15/286,662

(22) Filed: Oct. 6, 2016

(65) Prior Publication Data

US 2017/0101095 A1   Apr. 13, 2017

(30) Foreign Application Priority Data

Oct. 13, 2015   (EP) .................................... 15189537

(51) Int. Cl.
*B60W 30/14* (2006.01)
*B60T 1/14* (2006.01)
(Continued)

(52) U.S. Cl.
CPC .............. *B60W 30/146* (2013.01); *B60T 1/14* (2013.01); *B60T 7/22* (2013.01); *B60W 30/143* (2013.01);
(Continued)

(58) Field of Classification Search
CPC .. B60W 30/146; B60W 30/14; B60W 30/143; B60W 30/16; B60W 2050/0075;
(Continued)

(56) References Cited

U.S. PATENT DOCUMENTS

| 2004/0011606 A1* | 1/2004 | Lee ........................... B60T 1/14 188/200 |
| 2009/0150034 A1* | 6/2009 | Ezoe ......................... B60T 7/12 701/53 |
| 2010/0020170 A1* | 1/2010 | Higgins-Luthman ....................... B60Q 1/1423 348/135 |
| 2010/0036565 A1* | 2/2010 | Bernzen ................ B60R 21/013 701/45 |

(Continued)

FOREIGN PATENT DOCUMENTS

| DE | 102009041566 | 3/2011 |
| DE | 102011120179 | 11/2012 |

(Continued)

OTHER PUBLICATIONS

Extended European Search Report for European Application No. EP 15189537.2, Completed by the European Patent Office, dated May 9, 2016, 9 Pages.

*Primary Examiner* — Richard A Goldman
(74) *Attorney, Agent, or Firm* — Brooks Kushman P.C.

(57) ABSTRACT

A driving aid arrangement configured to control a longitudinal velocity of a host vehicle, the arrangement including a driving environment monitoring unit, a road friction estimation unit configured to provide a road friction estimate, and a velocity control unit configured to control the velocity of the host vehicle on the basis of the monitored driving environment and the road friction estimate. The velocity control unit is further configured to control the velocity of the host vehicle on the basis of a pre-set road friction value, corresponding to a high road friction value, if the road friction estimation unit is unable to provide the road friction estimate. The driving aid arrangement further comprises an enhanced braking system arranged to provide an emergency braking of the vehicle upon detection of a crash threat event.

20 Claims, 3 Drawing Sheets

(51) Int. Cl.
*B60T 7/22* (2006.01)
*B60W 50/00* (2006.01)

(52) U.S. Cl.
CPC ... *B60T 2201/022* (2013.01); *B60T 2201/024* (2013.01); *B60W 2050/0075* (2013.01); *B60W 2520/10* (2013.01); *B60W 2550/148* (2013.01); *B60W 2720/10* (2013.01)

(58) Field of Classification Search
CPC ....... B60W 2520/10; B60W 2550/148; B60W 2720/10; B60T 1/14; B60T 7/22; B60T 8/32; B60T 8/3205; B60T 8/56; B60T 8/58; B60T 8/72; B60T 8/86; B60T 8/88; B60T 2201/00; B60T 2201/02022; B60T 2201/024
USPC ............ 701/98, 45, 53; 188/5; 180/262, 164
See application file for complete search history.

(56) References Cited

U.S. PATENT DOCUMENTS

| | | | | |
|---|---|---|---|---|
| 2011/0017538 | A1* | 1/2011 | Baumann | B60T 1/14 180/164 |
| 2011/0155496 | A1* | 6/2011 | Baumann | B60R 21/0134 180/282 |
| 2011/0198161 | A1* | 8/2011 | Lomazzo | B60T 1/14 188/5 |
| 2015/0251659 | A1* | 9/2015 | Fischer | B60W 40/068 382/104 |
| 2017/0015287 | A1* | 1/2017 | Sander | B60T 1/12 |
| 2017/0101095 | A1* | 4/2017 | Nilsson | B60W 30/146 |

FOREIGN PATENT DOCUMENTS

| | | |
|---|---|---|
| DE | 102012112725 | 6/2014 |
| DE | 102013220693 | 4/2015 |

* cited by examiner

DRIVING AID ARRANGEMENT, A VEHICLE AND A METHOD OF CONTROLLING A LONGITUDINAL VELOCITY OF A VEHICLE

CROSS-REFERENCE TO RELATED APPLICATIONS

This application claims foreign priority benefits under 35 U.S.C. § 119(a)-(d) to European patent application number EP 15189537.2, filed Oct. 13, 2015, which is incorporated by reference in its entirety.

TECHNICAL FIELD

The present disclosure relates to a driving aid arrangement configured to control at least a longitudinal velocity of a host vehicle hosting the arrangement, a method of controlling a longitudinal velocity of a host vehicle using a driving aid arrangement, and a vehicle comprising a driving aid arrangement.

BACKGROUND

In recent years, driving aid arrangements such as autonomous cruise control arrangements (ACC), also called adaptive cruise control, have been developed in the automotive industry. An autonomous cruise control is a cruise control system for road vehicles that controls vehicle velocity and automatically adjusts the vehicle velocity to maintain a safe distance to preceding vehicles. In addition, semi-autonomous systems are available at the market which are capable of controlling steering, propulsion unit and wheel brakes of vehicles. In addition, fully-autonomous systems are under development which are capable of a full control of steering, propulsion unit and wheel brakes of vehicles to guide a vehicle along a route without intervention of a driver. Control in all these systems is usually based on sensor information from on-board sensors arranged to monitor a driving environment surrounding the vehicle. Such monitoring can be performed with good reliability by means of sensor arrangements such as RADAR (Radio Detection and Ranging) sensors and/or LASER (Light Amplification by Stimulated Emission of Radiation) sensors, and/or LIDAR (Light Detection and Ranging) sensors, and/or imaging sensors.

However, to perform a safe control of vehicle velocity, one must also have knowledge about a current tire to road friction. During travel, estimating a current tire to road friction is an inherently difficult task. Many methods and sensor arrangements have been developed for the purpose. Almost all of these methods and sensor arrangements have in common that they will not always be able to provide a tire to road friction estimate or will not always be able to provide a reliable tire to road friction estimate. In fact, during normal driving, these methods and sensor arrangements will most often not be able to provide a tire to road friction estimate, or at least not be able to provide a reliable tire to road friction estimate. When a reliable tire to road friction estimate cannot be provided, currently available driving aid arrangements usually assume a low tire to road friction, corresponding to a worst-case tire to road friction, and perform control of host vehicle velocity in dependence thereof.

A problem of the assumption of a low worst-case tire to road friction is that it results in greater distances to preceding vehicles and lower velocities of host vehicles, even in situations where the actual tire to road friction is significantly higher than the assumed worst-case tire to road friction, which most often is the case.

SUMMARY

An object of the present disclosure is to provide an improved control of a longitudinal velocity of a host vehicle.

According to an embodiment of the disclosure, the object is achieved by a driving aid arrangement configured to control at least a longitudinal velocity of a host vehicle hosting the arrangement, the arrangement comprising: a driving environment monitoring unit configured to monitor a driving environment surrounding the host vehicle, a tire to road friction estimation unit configured to selectively provide a first tire to road friction estimate during travel of the host vehicle, and a velocity control unit configured to control the longitudinal velocity of the host vehicle on the basis of at least the monitored driving environment and the first tire to road friction estimate to adjust the longitudinal velocity of the host vehicle such that at least one of a shorter distance to a preceding vehicle and a higher longitudinal velocity of the host vehicle is obtained when the first tire to road friction estimate indicates a high tire to road friction value than when the first tire to road friction estimate indicates a low tire to road friction value, wherein the velocity control unit further is configured to control the longitudinal velocity of the host vehicle on the basis of a pre-set tire to road friction value if the tire to road friction estimation unit is unable to provide the first tire to road friction estimate, wherein the pre-set tire to road friction value corresponds to the high tire to road friction value, and where the driving aid arrangement further comprises an enhanced braking system comprising a braking element, an actuator and a brake control unit, where the actuator is arranged to, upon activation, position the braking element in contact with a road surface on which the host vehicle is traveling to provide an emergency braking of the host vehicle, where the brake control unit is arranged to activate the actuator upon detection of a crash threat event.

Since the pre-set tire to road friction value corresponds to the high tire to road friction value and since the velocity control unit is configured to control the longitudinal velocity of the host vehicle on the basis of a pre-set tire to road friction value if the tire to road friction estimation unit is unable to provide the first tire to road friction estimate, the velocity control unit will adjust the longitudinal velocity of the host vehicle such that at least one of a shorter distance to a preceding vehicle and a higher longitudinal velocity of the host vehicle is obtained when the tire to road friction estimation unit is unable to provide the first tire to road friction estimate. As a result, a driving aid arrangement is provided which does not assume a low worst case tire to road friction value in cases where the tire to road friction estimation unit is unable to provide the first tire to road friction estimate and which thereby will not keep excessively large distances to preceding vehicles and/or an unjustifiably low host vehicle velocities in such situations.

Further, since the driving aid arrangement comprises an enhanced braking system capable of providing an emergency braking of the host vehicle upon detection of a crash threat event, the shorter distance to the preceding vehicle and/or the higher longitudinal velocity of the host vehicle is achieved with maintained, or even improved, safety of driving.

As a result, a driving aid arrangement is provided capable of adjusting the longitudinal velocity of the host vehicle such that at least one of a shorter distance to a preceding vehicle and a higher longitudinal velocity of the host vehicle is achieved with maintained, or even improved, safety of driving.

Thereby, acceptance of the driving aid arrangement may be improved and a driver of a vehicle hosting the arrangement may more frequently, and during longer periods, use the driving aid arrangement to control longitudinal velocity of the host vehicle. Thereby, safety of driving is further improved since the driving aid arrangement is generally capable of controlling the longitudinal velocity in a safer manner than a human driver.

As a further result, the driving aid arrangement will improve traffic flow, especially in cases were a plurality of vehicles are fitted with the driving aid arrangement since the arrangement allows for the shorter distances to the preceding vehicles and/or the higher longitudinal velocities of vehicles hosting the arrangement.

Accordingly, an improved control of a longitudinal velocity of a host vehicle is provided. Thus, the above mentioned object is achieved.

Optionally, the braking element comprises a vacuum plate. A vacuum plate is capable of decreasing braking distances significantly since a vacuum between the plate and the road surface on which the host vehicle is traveling will force the vacuum plate towards the road surface to thereby increase the brake effect. As a result, safety of driving is further improved.

Optionally, the pre-set tire to road friction value is within the range of 0.65-0.95. A tire to road friction value within the range of 0.65-0.95 is a tire to road friction value occurring under decent road conditions, for example under road conditions without occurrence of snow or ice on the road surface. Thus, in embodiments where the pre-set tire to road friction value is within the range of 0.65-0.95, the velocity control unit will control the longitudinal velocity of the host vehicle as if the road conditions were decent in cases where the tire to road friction estimation unit is unable to provide the first tire to road friction estimate. As a result, a driving aid arrangement is provided which does not assume a low worst case tire to road friction value in cases where the tire to road friction estimation unit is unable to provide the first tire to road friction estimate. Thereby, the driving aid arrangement will not keep excessively large distances to preceding vehicles or unjustifiably low host vehicle velocities in situations where the tire to road friction estimation unit is unable to provide the first tire to road friction estimate.

Optionally, the tire to road friction estimation unit is further configured to classify the first tire to road friction estimate as reliable or non-reliable where the velocity control unit further is configured to control the longitudinal velocity of the host vehicle on the basis of the pre-set tire to road friction value if the tire to road friction estimation unit is unable to provide a reliable first tire to road friction estimate. As a result, the velocity control unit will control the longitudinal velocity of the host vehicle such that at least one of a shorter distance to a preceding vehicle and a higher longitudinal velocity of the host vehicle is obtained when the tire to road friction estimation unit is unable to provide a reliable first tire to road friction estimate. As a result, a driving aid arrangement is provided which does not assume a low worst case tire to road friction value in cases where the tire to road friction estimation unit is unable to provide a reliable first tire to road friction estimate and which will thereby not keep excessively large distances to preceding vehicles or an unjustifiably low host vehicle velocities in such situations.

Optionally, the velocity control unit is further configured to control the longitudinal velocity of the host vehicle by selectively applying wheel brakes of the host vehicle. Thereby, safety of driving is further improved.

Optionally, the tire to road friction estimation unit is configured to provide a second tire to road friction estimate during braking of the host vehicle, and wherein the velocity control unit is configured to control the longitudinal velocity of the host vehicle on the basis of at least the second tire to road friction estimate when the second tire to road friction estimate is available. During braking, a more reliable tire to road friction estimate can be provided than during un-braked travel of the host vehicle. Therefore, the second tire to road friction estimate will be more reliable than the first tire to road friction estimate meaning that in most situations, the second tire to road friction estimate will be closer to an actual tire to road friction value than the first tire to road friction estimate. Accordingly, since the velocity control unit is configured to control the longitudinal velocity of the host vehicle on the basis of at least the second tire to road friction estimate when the second tire to road friction estimate is available, safety of driving is further improved.

Optionally, the crash threat event is, at least partially, detected by detection of the first tire to road friction estimate exceeding the second tire to road friction estimate with a predetermined threshold value. As mentioned, during braking, a more reliable tire to road friction estimate can be provided than during un-braked travel of the host vehicle. Therefore, the second tire to road friction estimate will be more reliable than the first tire to road friction estimate meaning that in most situations, the second tire to road friction estimate will be closer to an actual tire to road friction value than the first tire to road friction estimate. Thus, the detection that the first tire to road friction estimate exceeds the second tire to road friction estimate with a predetermined threshold value indicates that the first tire to road friction estimate is lower than an actual tire to road friction. Such an indication shows an increased risk of a crash. So, by detecting the crash threat event, at least partially, by detection of the first tire to road friction estimate being higher than the second tire to road friction estimate, further increases safety of driving.

Optionally, the crash threat event is, at least partially, detected by detection of the second tire to road friction estimate being insufficient for avoiding a crash. Thereby, safety of driving is further improved.

Further embodiments herein aim to provide a vehicle comprising a driving aid arrangement as described herein.

Further embodiments herein aim to provide a method of controlling a longitudinal velocity of a host vehicle using a driving aid arrangement comprising: driving environment monitoring unit, a tire to road friction estimation unit, a velocity control unit, and an enhanced braking system comprising a braking element, an actuator and a brake control unit, where the actuator is arranged to, upon activation, position the braking element in contact with a road surface on which the host vehicle is traveling to provide an emergency braking of the host vehicle, wherein the method comprises: monitoring a driving environment surrounding the host vehicle, using the driving environment monitoring unit, selectively providing a first tire to road friction estimate during travel of the host vehicle, using the tire to road friction estimation unit, controlling the longitudinal velocity of the host vehicle on the basis of at least the monitored driving environment and the first tire to road friction estimate to adjust the longitudinal velocity of the host vehicle such that at least one of a shorter distance to a preceding vehicle and a higher longitudinal velocity of the host vehicle is obtained when the first tire to road friction estimate indicates a high tire to road friction value than when the first tire to road friction estimate indicates a low tire to road friction value, using the velocity control unit, controlling the longitudinal velocity of the host vehicle on the basis of a pre-set tire to road friction value if the tire to road friction estimation unit is unable to provide the first tire to road friction estimate, using the velocity control unit, wherein the pre-set tire to road friction value corresponds to the high tire to road friction value, and where the method further comprises: activating the actuator upon detection of a crash threat event, using the brake control unit.

Since the pre-set tire to road friction value corresponds to the high tire to road friction value and since the method comprises controlling the longitudinal velocity of the host vehicle on the basis of a pre-set tire to road friction value if the tire to road friction estimation unit is unable to provide the first tire to road friction estimate, the longitudinal velocity of the host vehicle will be controlled such that at least one of a shorter distance to a preceding vehicle and a higher longitudinal velocity of the host vehicle is obtained when the tire to road friction estimation unit is unable to provide the first tire to road friction estimate. As a result, a method is provided in which a low worst case tire to road friction value does not need to be assumed in cases where the tire to road friction estimation unit is unable to provide the first tire to road friction estimate and which will thereby not keep excessively large distances to preceding vehicles or an unjustifiably low host vehicle velocities in such situations.

Further, since the driving aid arrangement comprises an enhanced braking system and since the method comprises activating the actuator of the enhanced braking system upon detection of a crash threat event, the shorter distance to the preceding vehicle and/or the higher longitudinal velocity of the host vehicle is achieved with maintained, or even improved, safety of driving.

As a result, method is provided capable of adjusting the longitudinal velocity of the host vehicle such that at least one of a shorter distance to a preceding vehicle and a higher longitudinal velocity of the host vehicle is achieved with maintained, or even improved, safety of driving.

As a further result, the method provided will improve traffic flow, especially in cases were a plurality of vehicles uses the method of controlling a longitudinal velocity of a host vehicle since the method allows for the shorter distances to preceding vehicles and/or higher longitudinal velocities of vehicles using the method.

Accordingly, an improved control of a longitudinal velocity of a host vehicle is provided. Thus, the above mentioned object is achieved.

Optionally, the method further comprises: classifying the first tire to road friction estimate as reliable or non-reliable, using the tire to road friction estimation unit, and controlling the longitudinal velocity of the host vehicle on the basis of the pre-set tire to road friction value if the tire to road friction estimation unit is unable to provide a reliable first tire to road friction estimate, using the velocity control unit.

As a result, the method will control the longitudinal velocity of the host vehicle such that at least one of a shorter distance to a preceding vehicle and a higher longitudinal velocity of the host vehicle is obtained when the tire to road friction estimation unit is unable to provide a reliable first tire to road friction estimate. As a result, method is provided which does not assume a low worst case tire to road friction value in cases where the tire to road friction estimation unit is unable to provide a reliable first tire to road friction estimate and which will thereby not keep excessively large distances to preceding vehicles or an unjustifiably low host vehicle velocities in such situations.

Optionally, the method further comprises: controlling the longitudinal velocity of the host vehicle by selectively applying wheel brakes of the host vehicle, using the velocity control unit. Thereby, safety of driving is further improved.

Optionally, the method further comprises: providing a second tire to road friction estimate during braking of the host vehicle, using the tire to road friction estimation unit, and controlling the longitudinal velocity of the host vehicle on the basis of at least the second tire to road friction estimate when the second tire to road friction estimate is available, using the velocity control unit.

During braking, a more reliable tire to road friction estimate can be provided than during un-braked travel of the host vehicle. Therefore, the second tire to road friction estimate will be more reliable than the first tire to road friction estimate meaning that in most situations, the second tire to road friction estimate will be closer to an actual tire to road friction value than the first tire to road friction estimate. Accordingly, safety of driving is further improved since the method comprises controlling the longitudinal velocity of the host vehicle on the basis of at least the second tire to road friction estimate when the second tire to road friction estimate is available.

Optionally, the method further comprises: detecting the crash threat event, at least partially, by detecting the first tire to road friction estimate exceeding the second tire to road friction estimate with a predetermined threshold value.

As mentioned, during braking, a more reliable tire to road friction estimate can be provided than during un-braked travel of the host vehicle. Therefore, the second tire to road friction estimate will be more reliable than the first tire to road friction estimate meaning that in most situations, the second tire to road friction estimate will be closer to an actual tire to road friction value than the first tire to road friction estimate. Thus, the detection that the first tire to road friction estimate exceeds the second tire to road friction estimate with a predetermined threshold value indicates that the first tire to road friction estimate is lower than an actual tire to road friction. Such an indication shows an increased risk of a crash. So, by detecting the crash threat event, at least partially, by detection of the first tire to road friction estimate being higher than the second tire to road friction estimate, further increases safety of driving.

Optionally, the method further comprises: detecting the crash threat event, at least partially, by detecting the second tire to road friction estimate being insufficient for avoiding a crash.

Thereby, safety of driving is further improved.

Further features of, and advantages with, the present disclosure will become apparent when studying the appended claims and the following detailed description. Those skilled in the art will realize that the different features described may be combined to create embodiments other than those described in the following, without departing from the scope of the present disclosure, as defined by the appended claims.

BRIEF DESCRIPTION OF THE DRAWINGS

Various embodiments of the disclosure, including its particular features and advantages, will be readily understood from the following detailed description and the accompanying drawings, in which.

DETAILED DESCRIPTION

Figure 1:
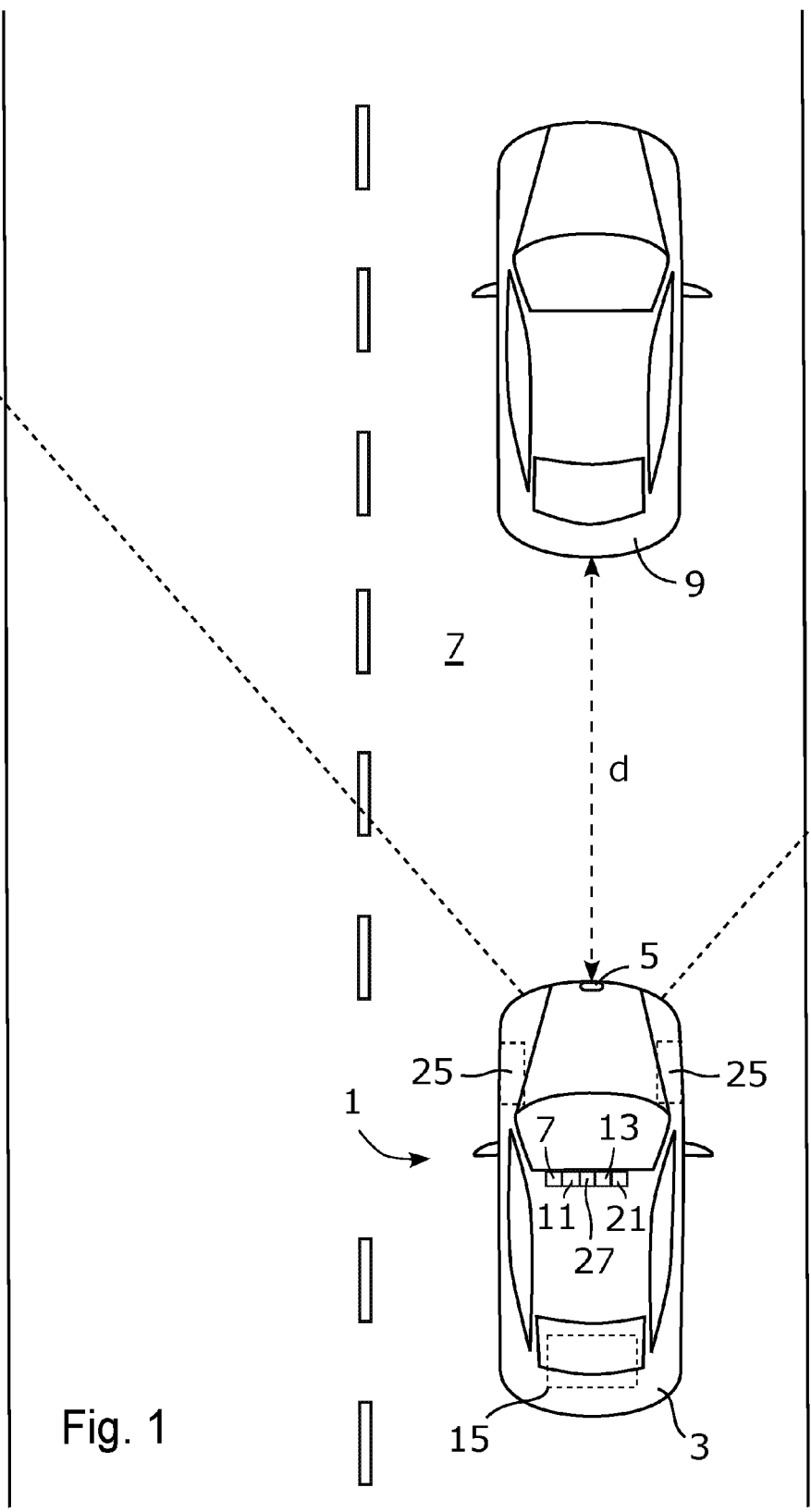
FIG. 1 illustrates a vehicle comprising a driving aid arrangement.

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Direct methods: Estimation of a friction value by estimation of tire forces during interventions of a dynamic stability system and/or traction control system, using available vehicle dynamics information such as acceleration and vehicle mass, tire forces in x-, y- and z-direction may be estimated. The tire forces may be used to calculate a maximum friction value during an intervention, which maximum friction value may be used as an estimated friction value.

Estimation of a friction value by using the self-aligning torque Mz. A theoretical relation between the self-aligning torque Mz and tire forces may be used. This method is e.g. explained in the publication "Road Friction Estimation, part II".

Estimate the friction value by means of the longitudinal slip and estimated/calculated tire forces. A tire model, the brush model, may be used to model the tires of the vehicle. The brush model simplifies the tire and road contact patch as a brush. The model takes into consideration stiffness of the brush, tire forces and the slip, i.e. a ratio between a forward velocity of wheel and a forward velocity of vehicle. The slip and tire forces are measured and then the stiffness of the tire may be estimated and used to estimate the friction value. This method is e.g. explained in the publication "Road Friction Estimation, part II".

Tire mounted sensors such as strain gauges and accelerometers in order to estimate tire forces and a friction value.

A characteristic for indirect methods is that the friction itself is not estimated, but an indirect indicator, e.g. sound or optical characteristics.

Indirect methods: Road surface classification using near infrared spectroscopy or camera which is coupled with a friction value. This method is e.g. explained in the publication "Road Friction Estimation, part II".

Tire mounted sensors such as strain gauges and accelerometers which estimates road surface textures which are coupled to a friction value.

Rain sensor, temperature sensor, wiper speed and similar parameters are used for confirming other friction estimations (not enough information to make a friction estimate on their own).

Road surface classification by analyzing the sound created in the tire to road contact patch which is coupled to a friction value.

V2I2V (vehicle-to-infrastructure-to-vehicle) and V2V (vehicle-to-vehicle) communication to get a road friction estimate made by e.g. other vehicles.

The tire to road friction estimation unit 11 may use a combination of direct and indirect methods to selectively provide the first tire to road friction estimate during travel of the host vehicle 3. By using a combination of methods and by using a combination of input data, a reliable friction value may be obtained.

The feature that the tire to road friction estimation unit 11 is configured to selectively provide the first tire to road friction estimate during travel of the host vehicle 3 implies that the tire to road friction estimation unit 11 will provide the first tire to road friction estimate when the tire to road friction estimation unit 11 is able to provide the first tire to road friction estimate and that the tire to road friction estimation unit 11 will not provide the first tire to road friction estimate when the tire to road friction estimation unit 11 is unable to provide the first tire to road friction estimate. The tire to road friction estimation unit 11 will be able to provide the first tire to road friction estimate when conditions allow and will not provide the first tire to road friction estimate when conditions does not allow. Such conditions are driving environment conditions and input data indicative of such driving environment conditions.

The driving aid arrangement 1 comprises a velocity control unit 13 configured to control the longitudinal velocity of the host vehicle 3 on the basis of at least the monitored driving environment 7 and the first tire to road friction estimate to adjust the longitudinal velocity of the host vehicle 3 such that at least one of a shorter distance d to a preceding vehicle 9 and a higher longitudinal velocity of the host vehicle 3 is obtained when the first tire to road friction estimate indicates a high tire to road friction value as compared to when the first tire to road friction estimate indicates a low tire to road friction value. The velocity control unit 13 is configured to control the longitudinal velocity of the host vehicle 3 by controlling a propulsion unit of the host vehicle 3 and/or by controlling wheel brakes 25 of the host vehicle 3.

The velocity control unit 13 further is configured to control the longitudinal velocity of the host vehicle 3 on the basis of a pre-set tire to road friction value if the tire to road friction estimation unit 11 is unable to provide the first tire to road friction estimate. As mentioned above, estimating a current tire to road friction during travel of the host vehicle is an inherently difficult task. Therefore, in many situations, the tire to road friction estimation unit 11 will be unable to provide the first tire to road friction estimate.

The pre-set tire to road friction value corresponds to the high tire to road friction value. Thereby, the velocity control unit 13 will adjust the longitudinal velocity of the host vehicle 3 such that at least one of a shorter distance d to a preceding vehicle 9 and a higher longitudinal velocity of the host vehicle 3 is obtained when the tire to road friction estimation unit is unable to provide the first tire to road friction estimate. As a result, a driving aid arrangement 1 is provided which does not assume a low worst case tire to road friction value in cases where the tire to road friction estimation unit is unable to provide the first tire to road friction estimate and which will thereby not keep excessively large distances to preceding vehicles 9 or unjustifiably low host vehicle velocities in such situations. Still, when the first tire to road friction estimate indicates a low tire to road friction value, the velocity control unit 13 will adjust the longitudinal velocity of the host vehicle 3 such that at least one of a greater distance d to a preceding vehicle 9 and a lower longitudinal velocity of the host vehicle 3 is obtained.

According to some embodiments, the pre-set tire to road friction value is within the range of 0.65-0.95. A tire to road friction value within the range of 0.65-0.95 is a tire to road friction value occurring under decent road conditions, for example under road conditions without occurrence of snow or ice on the road surface. Thus, in embodiments where the pre-set tire to road friction value is within the range of 0.65-0.95, the velocity control unit 13 will control the longitudinal velocity of the host vehicle 3 as if the tire to road friction value is decent in cases where the tire to road friction estimation unit 11 is unable to provide the first tire to road friction estimate. According to further embodiments, the pre-set tire to road friction value is within the range of 0.70-0.9. According to even further embodiments, the pre-set tire to road friction value is within the range of 0.75-0.85. According to still further embodiments, the pre-set tire to road friction value is within the range of 0.78-0.82. According to all those embodiments, the pre-set tire to road friction value is within a range of friction values occurring under decent road conditions.

Figure 2:
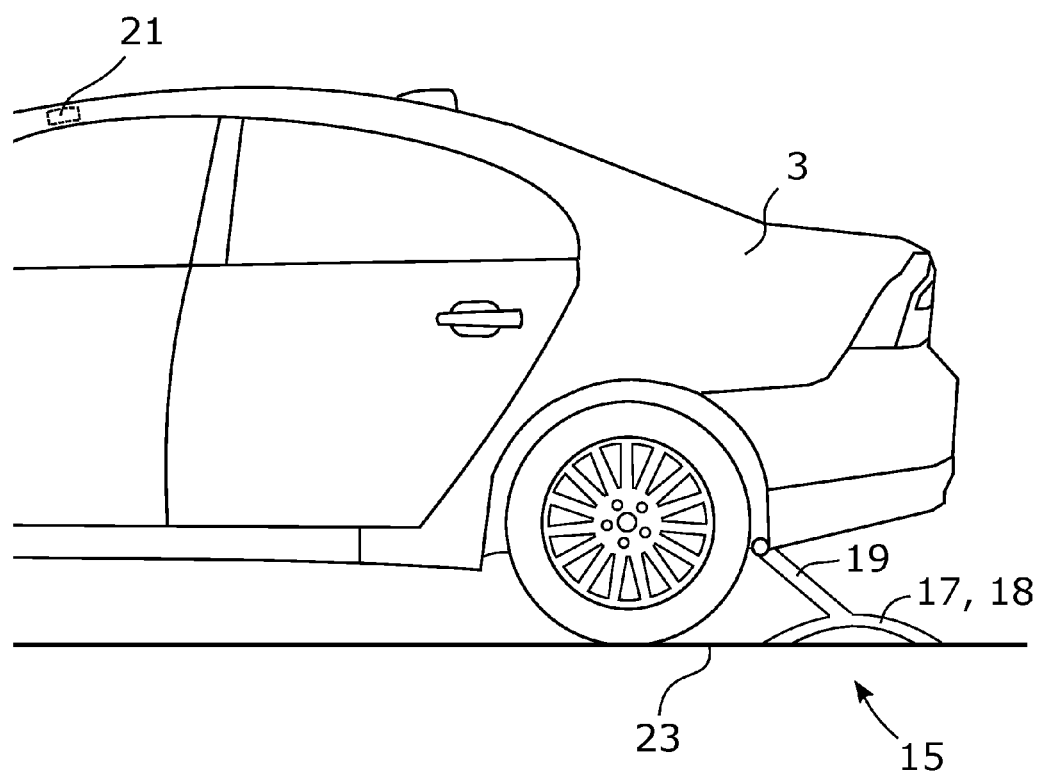
FIG. 2 illustrates the enhanced braking system of the host vehicle.

The driving aid arrangement 1 further comprises an enhanced braking system 15. FIG. 2 illustrates the enhanced braking system 15 of the host vehicle 3 illustrated in FIG. 1. The enhanced braking system 15 comprises a braking element 17, an actuator 19 and a brake control unit 21. The actuator 19 is arranged to, upon activation, position the braking element 17 in contact with a road surface 23 on which the host vehicle 3 is traveling to provide an emergency braking of the host vehicle 3. In the embodiment illustrated in FIG. 2, the braking element 17 comprises a vacuum plate 18 and the actuator 19 comprises a pneumatic arm arranged to position the vacuum plate 18 in contact with the road surface 23. Upon being positioned in contact with the road surface 23, a vacuum formed between the vacuum plate 18 and the road surface 23 will force the vacuum plate 18 towards the road surface 23. Thereby, a substantial braking effect is achieved. The enhanced braking system 15 may comprise other types of braking elements which when in contact with the road surface 23 provide an emergency braking of the host vehicle 3. Examples of such braking elements are a plate with high coefficient of friction and a hook and wire arrangement, not shown in FIG. 2. According to some embodiments, the actuator 19 is arranged to, upon activation, press the braking element 17 against the road surface 23 on which the host vehicle 3 is traveling to provide an emergency braking of the host vehicle 3.

Below, reference is made to FIG. 1 and FIG. 2. The brake control unit 21 is arranged to activate the actuator 19 upon detection of a crash threat event. The brake control unit 21 may be arranged to determine a level of crash threat and detect the crash threat event by analysing the driving environment 7 monitored by the driving environment monitoring unit 5 and the longitudinal velocity of the host vehicle 3. Such analyzing may encompass analyzing a profile of an upcoming section of the road and presence of, and location of, other road users such as other vehicles and pedestrians. The brake control unit 21 may detect the collision threat event and determine a level of crash threat by comparing the distance d to a preceding vehicle 9 and a monitored relative velocity between the host vehicle 3 and the preceding vehicle 9.

According to some embodiments, the tire to road friction estimation unit 11 is configured to classify the first tire to road friction estimate as reliable or non-reliable where the velocity control unit 13 further is configured to control the longitudinal velocity of the host vehicle 3 on the basis of the pre-set tire to road friction value if the tire to road friction estimation unit 11 is unable to provide a reliable first tire to road friction estimate. As a result, the velocity control unit 13 will adjust the longitudinal velocity of the host vehicle 3 such that at least one of a shorter distance d to a preceding vehicle 9 and a higher longitudinal velocity of the host vehicle 3 is obtained when the tire to road friction estimation unit is unable to provide a reliable first tire to road friction estimate. The tire to road friction estimation unit 11 may be configured to classify the first tire to road friction estimate as reliable or non-reliable on the basis of the method in which the tire to road friction was estimated. For example, a tire to road friction estimated with a direct method may be classified as reliable and a tire to road friction estimated with an indirect method may be classified as un-reliable. That is, a first tire to road friction estimate obtained during interventions of a dynamic stability system and/or traction control system will be classified as reliable whereas a first tire to road friction estimate obtained by analyzing data from of rain sensor, temperature sensor, wiper speed and similar will be classified as non-reliable. Further, tire to road friction data received by the communication unit 27 indicating a certain tire to road friction of a vehicle recently having travelled on an upcoming portion of the road on which the host vehicle 3 is travelling may be classified as reliable, whereas when more time has elapsed since the vehicle travelled on the upcoming portion of the road, the first tire to road friction estimate may be classified as non-reliable. In addition, as mention above, a first tire to road friction estimate obtained using a combination of methods and/or using a combination of input data, may be classified as reliable. According to some embodiments, the tire to road friction estimation unit 11 is configured to classify the first tire to road friction estimate as reliable or non-reliable by weighing methods and/or input data used to provide first tire to road friction estimate.

According to some embodiments, the velocity control unit 13 is further configured to control the longitudinal velocity of the host vehicle 3 by selectively applying wheel brakes 25 of the host vehicle 3. The velocity control unit 13 may for example be configured to apply the wheel brakes 25 of the host vehicle 3 when a distance d to a preceding vehicle 9 and a relative velocity between the host vehicle 3 and the preceding vehicle 9 indicates that controlling of a propulsion unit of the host vehicle 3 is not enough to keep a safe distance to the preceding vehicle 9. The velocity control unit 13 may further be configured to apply the wheel brakes 25 of the host vehicle 3 upon detection of a pedestrian or other road user as well as upon detection of a crash threat event such as a collision threat event and/or a road departure threat event. As an alternative, or in combination, the velocity control unit 13 may be configured to apply the wheel brakes 25 of the host vehicle 3 to provide a more reliable tire to road friction estimate, referred to as the second tire to road friction estimate below.

According to some embodiments, the tire to road friction estimation unit 11 is configured to provide a second tire to road friction estimate during braking of the host vehicle 3. The second tire to road friction estimate will be more reliable than the first tire to road friction estimate since the second tire to road friction estimate is provided during braking. During braking, forces between the tires and the road are much higher than during un-braked travel of the host vehicle 3 and therefore a much more reliable tire to road friction estimate can be provided. Thus, the second tire to road friction estimate will be closer to an actual tire to road friction value than the first tire to road friction estimate. The tire to road friction estimation unit 11 may be configured to provide a second tire to road friction estimate during braking of the host vehicle 3 by using a direct method. For example, the road friction estimation unit 11 may be configured to provide a second tire to road friction estimate by estimation of tire forces during interventions of an anti-lock braking system (ABS), using available vehicle dynamics information such as acceleration and vehicle mass, tire forces in x-, y- and z-direction. The tire forces may be used to calculate a maximum friction value during an intervention, which maximum friction value may be used as a second tire to road friction estimate.

According to some embodiments, the velocity control unit 13 is configured to control the longitudinal velocity of the host vehicle 3 on the basis of at least the second tire to road friction estimate when the second tire to road friction estimate is available. Thereby, safety of driving is further improved since the second tire to road friction estimate is more reliable than the first tire to road friction estimate. Further, as indicated above, the velocity control unit 13 may be configured to apply the wheel brakes 25 of the host vehicle 3 to allow for the tire to road friction estimation unit to provide the second tire to road friction estimate. The velocity control unit 13 may for example be configured to apply the wheel brakes 25 of the host vehicle 3 to allow for the tire to road friction estimation unit to provide the second tire to road friction estimate when the tire to road friction estimation unit 11 is unable to provide a reliable first tire to road friction estimate and/or when the monitored driving environment 7 indicates a certain level of threat.

According to some embodiments, the crash threat event is, at least partially, detected by detection of the first tire to road friction estimate exceeding the second tire to road friction estimate with a predetermined threshold value. According to further embodiments, the crash threat event is, at least partially, detected by detection of at least one of the first tire to road friction estimate and the pre-set tire to road friction value exceeding the second tire to road friction estimate with a predetermined threshold value. According to some embodiments, predetermined threshold value is within the range of 0-0.3. In embodiments where the predetermined threshold value is 0, the crash threat event is, at least partially, detected by detection of at least one of the first tire to road friction estimate and the pre-set tire to road friction value being higher than the second tire to road friction estimate. As concluded above, the second road friction estimate can be assumed to be closer to an actual tire to road friction than the first tire to road friction estimate. Thus, the detection of at least one of the first tire to road friction estimate and the pre-set tire to road friction value exceeding the second tire to road friction estimate with the predetermined threshold value indicates that the actual tire to road friction is lower than expected. This indicates an increased risk of an impending crash. Thus, since the crash threat event is, at least partially, detected by detection oft at least one of the first tire to road friction estimate and the pre-set tire to road friction value exceeding the second tire to road friction estimate with the predetermined threshold value, safety of driving is further improved.

According to some embodiments, the crash threat event is, at least partially, detected by detection of the second tire to road friction estimate being insufficient for avoiding a crash. For example, the brake control unit 21 may compare the second tire to road friction estimate with the distance d to a preceding vehicle 9, or another road user, and a relative velocity between the host vehicle 3 and the preceding vehicle 9 to detect that the second tire to road friction estimate is insufficient for avoiding a collision between the host vehicle 3 and the preceding vehicle 9. Likewise, the brake control unit 21 may compare the second tire to road friction estimate with the distance d to a section of the road where a road departure is estimated and detecting that the second tire to road friction estimate is insufficient for avoiding a road departure. Upon such detection, the brake control unit 21 is arranged to activate the actuator 19.

As concluded above, the brake control unit 21 is arranged to activate the actuator 19 upon detection of a crash threat event. The crash threat event may be considered as detected, and the brake control unit 21 may be arranged to only activate the actuator 19, when all of the following conditions are fulfilled: 1) The tire to road friction estimation unit 5 is unable to provide the first tire to road friction estimate, or the tire to road friction estimation unit 5 is unable to provide a reliable first tire to road friction estimate, or the first tire to road friction estimate is higher than the second tire to road friction estimate, 2) the determined level of crash threat exceeds a predetermined threshold value, 3) autonomous braking has been initiated to avoid a crash, and 4) the second tire to road friction estimate is insufficient for avoiding a crash.

By only activating the actuator 19, when all of the above conditions are fulfilled, the enhanced braking system 15 rarely has to be used. But when used, the enhanced braking system 15 will increase braking effect to thereby increase the chances of avoiding a crash.

Those skilled in the art will also appreciate that the driving environment monitoring unit 5, the tire to road friction estimation unit 11, the velocity control unit 13, enhanced braking system 15, braking control unit 21, and/or any other unit, system or device described herein may comprise, in whole or in part, a combination of analog and digital circuits and/or one or more processors configured with software and/or firmware, e.g. stored in a memory, that when executed by the one or more processors perform the functions and/or operations described herein. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Furthermore, the driving environment monitoring unit 5, the tire to road friction estimation unit 11, the velocity control unit 13, enhanced braking system 15, braking control unit 21, and/or any other unit, system or device described herein may for instance be implemented in one or several arbitrary nodes comprised in the vehicle 3. A node may be an electronic control unit (ECU) or any suitable generic electronic device, and may involve, for instance, a main central node. The node may, as a complement to being represented by, e.g., one or several integrated ECUs, be represented by a plug-in solution, for instance a dongle. In that manner, an aftermarket solution may be provided to any arbitrary vehicle suitable.

Figure 3:
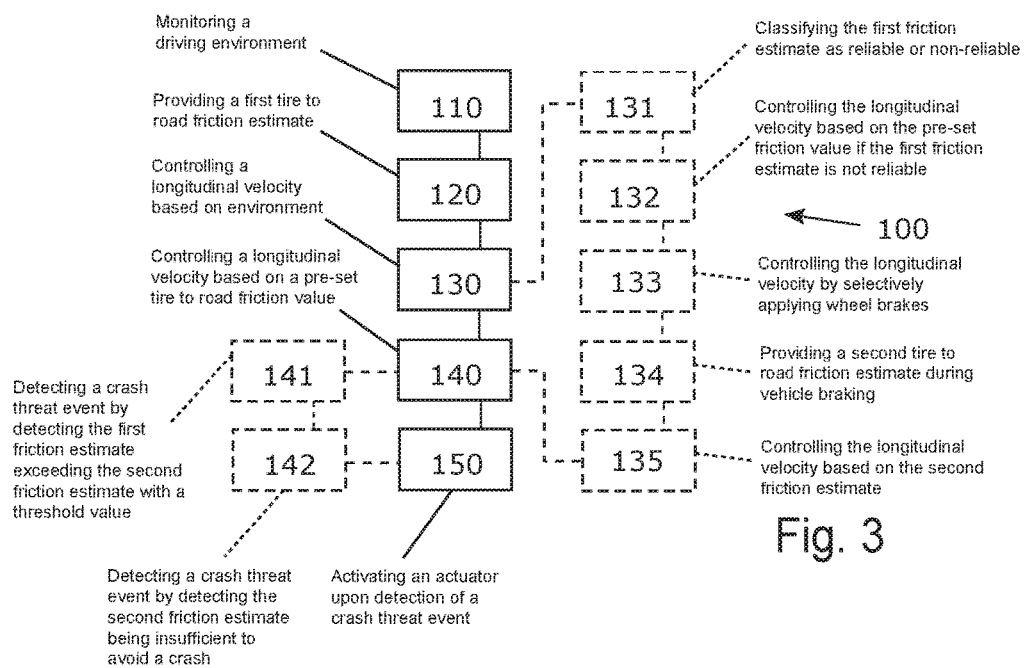
FIG. 3 illustrates a method of controlling a longitudinal velocity of a host vehicle using a driving aid arrangement.

FIG. 3 illustrates a method 100 of controlling a longitudinal velocity of a host vehicle using a driving aid arrangement comprising: driving environment monitoring unit, a tire to road friction estimation unit, a velocity control unit, and an enhanced braking system comprising a braking element, an actuator and a brake control unit, where the actuator is arranged to, upon activation, position the braking element in contact with a road surface on which the host vehicle is traveling to provide an emergency braking of the host vehicle, wherein the method 100 comprises: monitoring 110 a driving environment surrounding the host vehicle, using the driving environment monitoring unit, selectively providing 120 a first tire to road friction estimate during travel of the host vehicle, using the tire to road friction estimation unit, controlling 130 the longitudinal velocity of the host vehicle on the basis of at least the monitored driving environment and the first tire to road friction estimate to adjust the longitudinal velocity of the host vehicle such that at least one of a shorter distance d to a preceding vehicle and a higher longitudinal velocity of the host vehicle is obtained when the first tire to road friction estimate indicates a high tire to road friction value than when the first tire to road friction estimate indicates a low tire to road friction value, using the velocity control unit, controlling 140 the longitudinal velocity of the host vehicle on the basis of a pre-set tire to road friction value if the tire to road friction estimation unit is unable to provide the first tire to road friction estimate, using the velocity control unit, wherein the pre-set tire to road friction value corresponds to the high tire to road friction value, and where the method 100 further comprises activating 150 the actuator upon detection of a crash threat event, using the brake control unit.

According to some embodiments, the method 100 further comprises: classifying 131 the first tire to road friction estimate as reliable or non-reliable, using the tire to road friction estimation unit, and controlling 132 the longitudinal velocity of the host vehicle on the basis of the pre-set tire to road friction value if the tire to road friction estimation unit is unable to provide a reliable first tire to road friction estimate, using the velocity control unit.

According to some embodiments, the method 100 further comprises: controlling 133 the longitudinal velocity of the host vehicle by selectively applying wheel brakes of the host vehicle, using the velocity control unit.

According to some embodiments, the method 100 further comprises: providing 134 a second tire to road friction estimate during braking of the host vehicle, using the tire to road friction estimation unit, and controlling 135 the longitudinal velocity of the host vehicle on the basis of at least the second tire to road friction estimate when the second tire to road friction estimate is available, using the velocity control unit.

According to some embodiments, the method 100 further comprises: detecting 141 the crash threat event, at least partially, by detecting the first tire to road friction estimate exceeding the second tire to road friction estimate with a predetermined threshold value.

According to some embodiments, the method 100 further comprises: detecting 142 the crash threat event, at least partially, by detecting the second tire to road friction estimate being insufficient for avoiding a crash.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A driving aid arrangement configured to control at least a longitudinal velocity of a host vehicle hosting the arrangement, the arrangement comprising:
   a driving environment monitoring unit configured to monitor a driving environment surrounding the host vehicle;
   a tire to road friction estimation unit configured to selectively provide a first tire to road friction estimate during travel of the host vehicle;
   a velocity control unit configured to control the longitudinal velocity of the host vehicle on the basis of at least the monitored driving environment and the first tire to road friction estimate to adjust the longitudinal velocity of the host vehicle such that at least one of a shorter distance (d) to a preceding vehicle and a higher longitudinal velocity of the host vehicle is obtained when the first tire to road friction estimate indicates a high tire to road friction value than when the first tire to road friction estimate indicates a low tire to road friction value, the velocity control unit further configured to control the longitudinal velocity of the host vehicle on the basis of a pre-set tire to road friction value when the tire to road friction estimation unit is unable to provide the first tire to road friction estimate, wherein the pre-set tire to road friction value corresponds to the high tire to road friction value; and
   an enhanced braking system comprising a braking element, an actuator and a brake control unit, wherein the actuator is arranged to, upon activation, position the braking element in contact with a road surface on which the host vehicle is traveling to provide an emergency braking of the host vehicle, and the brake control unit is arranged to activate the actuator upon detection of a crash threat event.

2. The arrangement according to claim 1 wherein the braking element comprises a vacuum plate.

3. The arrangement according to claim 1 wherein the pre-set tire to road friction value is within the range of 0.65-0.95.

4. The arrangement according to claim 1 wherein the tire to road friction estimation unit is further configured to classify the first tire to road friction estimate as reliable or non-reliable where the velocity control unit further is configured to control the longitudinal velocity of the host vehicle on the basis of the pre-set tire to road friction value when the tire to road friction estimation unit is unable to provide a reliable first tire to road friction estimate.

5. The arrangement according to claim 1 wherein the velocity control unit is further configured to control the longitudinal velocity of the host vehicle by selectively applying wheel brakes of the host vehicle.

6. The arrangement according to claim 1 wherein the tire to road friction estimation unit is configured to provide a second tire to road friction estimate during braking of the host vehicle, and wherein the velocity control unit is configured to control the longitudinal velocity of the host vehicle on the basis of at least the second tire to road friction estimate when the second tire to road friction estimate is available.

7. The arrangement according to claim 6 wherein the crash threat event is, at least partially, detected by detection of the first tire to road friction estimate exceeding the second tire to road friction estimate with a predetermined threshold value.

8. The arrangement according to claim 6 wherein the crash threat event is, at least partially, detected by detection of the second tire to road friction estimate being insufficient for avoiding a crash.

9. A vehicle comprising a driving aid arrangement according to claim 1.

10. The arrangement according to claim 1 wherein the pre-set tire to road friction value is within the range of 0.65-0.95.

11. The arrangement according to claim 1 wherein the tire to road friction estimation unit is further configured to classify the first tire to road friction estimate as reliable or non-reliable where the velocity control unit further is configured to control the longitudinal velocity of the host vehicle on the basis of the pre-set tire to road friction value when the tire to road friction estimation unit is unable to provide a reliable first tire to road friction estimate.

12. The arrangement according to claim 1 wherein the velocity control unit is further configured to control the longitudinal velocity of the host vehicle by selectively applying wheel brakes of the host vehicle.

13. The arrangement according to claim 1 wherein the tire to road friction estimation unit is configured to provide a second tire to road friction estimate during braking of the host vehicle, and wherein the velocity control unit is configured to control the longitudinal velocity of the host vehicle on the basis of at least the second tire to road friction estimate when the second tire to road friction estimate is available.

14. A method of controlling a longitudinal velocity of a host vehicle using a driving aid arrangement including a driving environment monitoring unit, a tire to road friction estimation unit, a velocity control unit, and an enhanced braking system having a braking element, an actuator and a brake control unit, where the actuator is arranged to, upon activation, position the braking element in contact with a road surface on which the host vehicle is traveling to provide an emergency braking of the host vehicle, the method comprising:
  monitoring a driving environment surrounding the host vehicle, using the driving environment monitoring unit;
  selectively providing a first tire to road friction estimate during travel of the host vehicle, using the tire to road friction estimation unit;
  controlling the longitudinal velocity of the host vehicle on the basis of at least the monitored driving environment and the first tire to road friction estimate to adjust the longitudinal velocity of the host vehicle such that at least one of a shorter distance (d) to a preceding vehicle and a higher longitudinal velocity of the host vehicle is obtained when the first tire to road friction estimate indicates a high tire to road friction value than when the first tire to road friction estimate indicates a low tire to road friction value, using the velocity control unit;
  controlling the longitudinal velocity of the host vehicle on the basis of a pre-set tire to road friction value when the tire to road friction estimation unit is unable to provide the first tire to road friction estimate, using the velocity control unit, wherein the pre-set tire to road friction value corresponds to the high tire to road friction value; and
  activating the actuator upon detection of a crash threat event, using the brake control unit.

15. The method according to claim 14 further comprising:
  classifying the first tire to road friction estimate as reliable or non-reliable, using the tire to road friction estimation unit, and
  controlling the longitudinal velocity of the host vehicle on the basis of the pre-set tire to road friction value when the tire to road friction estimation unit is unable to provide a reliable the first tire to road friction estimate, using the velocity control unit.

16. The method according to claim 14 further comprising controlling the longitudinal velocity of the host vehicle by selectively applying wheel brakes of the host vehicle, using the velocity control unit.

17. The method according to claim 14 further comprising:
  providing a second tire to road friction estimate during braking of the host vehicle, using the tire to road friction estimation unit, and
  controlling the longitudinal velocity of the host vehicle on the basis of at least the second tire to road friction estimate when the second tire to road friction estimate is available, using the velocity control unit.

18. The method according to claim 17 further comprising detecting the crash threat event, at least partially, by detecting the first tire to road friction estimate exceeding the second tire to road friction estimate with a predetermined threshold value.

19. The method according to claim 17 further comprising detecting the crash threat event, at least partially, by detecting the second tire to road friction estimate being insufficient for avoiding a crash.

20. A driving aid arrangement configured to control at least a longitudinal velocity of a host vehicle hosting the arrangement, the arrangement comprising:
  a driving environment monitoring unit configured to monitor a driving environment surrounding the host vehicle;
  a tire to road friction estimation unit configured to selectively provide a first tire to road friction estimate during travel of the host vehicle; and
  a velocity control unit configured to control the longitudinal velocity of the host vehicle on the basis of at least the monitored driving environment and the first tire to road friction estimate to adjust the longitudinal velocity of the host vehicle such that at least one of a shorter distance (d) to a preceding vehicle and a higher longitudinal velocity of the host vehicle is obtained when the first tire to road friction estimate indicates a high tire to road friction value than when the first tire to road friction estimate indicates a low tire to road friction value, the velocity control unit further configured to control the longitudinal velocity of the host vehicle on the basis of a pre-set tire to road friction value when the tire to road friction estimation unit is unable to provide the first tire to road friction estimate, wherein the pre-set tire to road friction value corresponds to the high tire to road friction value.

* * * * *